United States Patent [19]

Bowen

[11] Patent Number: 5,427,137
[45] Date of Patent: Jun. 27, 1995

[54] FLUID SHUT OFF VALVE AND FILL LEVEL INDICATION

[76] Inventor: James H. Bowen, 12190 Richland Dr., Catharpin, Va. 22018

[21] Appl. No.: 166,932

[22] Filed: Dec. 15, 1993

[51] Int. Cl.$^6$ .................. F16K 31/24; F16K 33/00; F16K 37/00
[52] U.S. Cl. ........................... 137/432; 73/308; 73/323; 116/204; 116/228; 137/433; 137/442; 137/447; 137/450; 137/554; 137/558; 137/614.2; 141/198; 200/84 C; 251/306; 340/624
[58] Field of Search .......... 137/416, 429, 430, 447, 137/450, 554, 557, 558, 433, 442, 613, 614.2; 141/198, 213, 216; 116/204, 227, 228, 267; 251/283, 306; 73/307, 308, 313, 314, 322.5; 200/84 R, 84 C, 190; 340/623, 624

[56] References Cited

U.S. PATENT DOCUMENTS

| | | | |
|---|---|---|---|
| 2,720,216 | 10/1955 | Scully | 137/558 |
| 3,344,808 | 11/1964 | Cary | 137/599.2 |
| 3,469,605 | 9/1969 | Courtot et al. | 137/630 |
| 3,570,532 | 3/1971 | Lendino | 137/558 |
| 3,688,795 | 9/1972 | Taylor | 137/558 |
| 3,719,203 | 3/1973 | Wettre | 137/554 |
| 3,931,955 | 1/1976 | Jacobs | 251/305 |
| 3,941,151 | 3/1976 | Biddle | 251/306 |
| 4,032,108 | 6/1977 | Kintner | 251/306 |
| 4,483,367 | 11/1984 | Ross, Jr. et al. | 137/446 |
| 4,572,478 | 2/1986 | Vogler et al. | 251/305 |
| 4,605,201 | 8/1986 | Miyazaki | 251/305 |
| 4,998,571 | 3/1991 | Blue et al. | 141/198 |
| 5,010,915 | 4/1991 | Johnson et al. | 137/448 |
| 5,027,870 | 7/1991 | Butterfield | 141/198 |
| 5,067,506 | 11/1991 | Ball et al. | 137/1 |
| 5,102,097 | 4/1992 | Davis et al. | 251/283 |
| 5,113,910 | 5/1992 | Ball | 137/630.15 |
| 5,152,315 | 10/1992 | Lagache | 137/448 |
| 5,174,345 | 12/1992 | Kesterman et al. | 141/198 |
| 5,207,241 | 4/1993 | Babb | 137/447 |
| 5,235,999 | 8/1993 | Lindquist et al. | 137/433 |
| 5,241,983 | 9/1993 | Lagache | 137/448 |

OTHER PUBLICATIONS

Guillotine Inc., P.O. Box 2768, Turlock, Calif. 95381 Material sent with Valve marked Pats. Pending.

Primary Examiner—George L. Walton

[57] ABSTRACT

A valve to monitor the level of fluid in an above ground storage tank while the tank is being filled, cutoff the flow of fluid when the tank is in a full condition, and as long as the filling pressure is on the valve the valve will remain cutoff even if the fluid level in the tank has lowered. A relief valve to drain the fluid remaining in the filling hose after the filling pressure is off. A sight level indicator to visually show that the tank is in a filled condition. A monitoring node to be used with or without the mechanical cutoff valve in a totally controlled application where the filling person is not responsible for shutting off the filling tank truck, with two switches, one to alert that the tank is near a filled condition and the second to alert that the tank is in a filled condition.

12 Claims, 7 Drawing Sheets

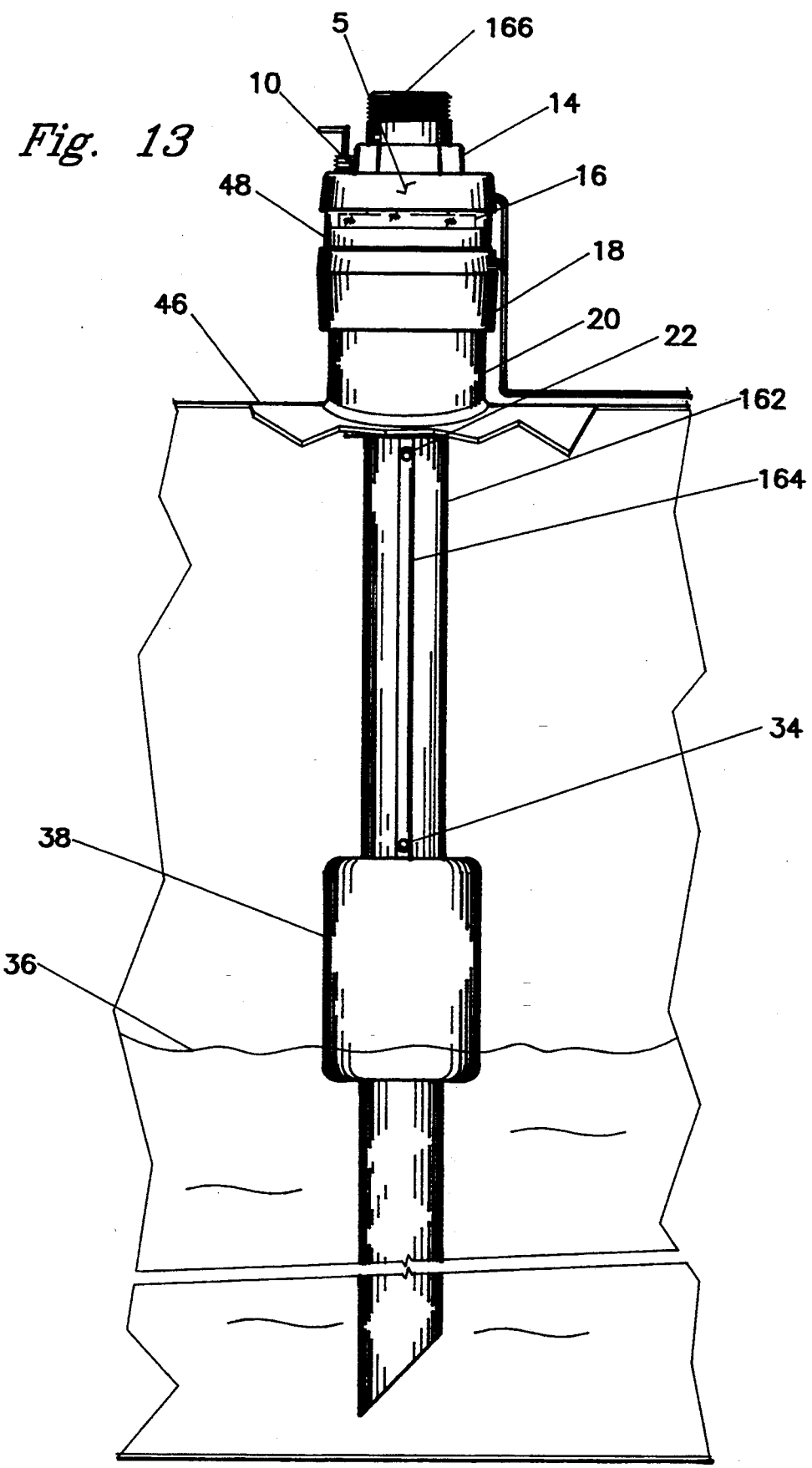

FLUID SHUT OFF VALVE AND FILL LEVEL INDICATION

BACKGROUND OF THE INVENTION

1. Field of the Invention

The present invention generally relates to a fluid shut-off valve for filling above ground storage tanks, and a sight and multiple switch indication for the level of the fluid that is being filled.

2. Description of the Prior Art

The days of the in-ground storage tanks are numbered. The world at large and environmental groups in particular are pushing for less pollution of the ground water emanating from leaking in-ground tanks that are not easily monitored to detect these leaks. Above ground tanks are becoming more practical. Especially with the tank in a tank design whereby the outer tank is monitored for moisture from the inner tank, and the installation of above ground tanks with moats around them that can be monitored for moisture.

The majority of shut-off valves to date generally relate to ones being used with in-ground tanks in which the fluid being fed into the tanks is gravity fed with large diameter hoses resulting in a filling pressure that is less than with above ground tanks that are pump charged through smaller diameter hoses. Above ground tanks are not necessarily in close proximity to the filling truck, therefore the smaller diameter longer hose with higher pressure is used to attain a satisfactory filling time. The smaller hoses are charged with filling pressures in the order of 70 to 120 psi and flow rates in the order of 200 to 300 gallons per minute. When using an in-ground valve to shut off a fluid in an above ground tank the valve will often snap shut when the tank reaches the desired filling capacity. This causes the charging pump to have an excessive amount of pressure that can damage the pump or other items used in the filling process.

New valves are now on the market trying to solve these problems. It is ironic though that for a shut off valve to operate properly it must shut off the fluid under high pressure and then leak under low pressure or flow in order to drain the filling hose. This calls for a unique type of valve designed just for this purpose.

One such device is disclosed in U.S. Pat. No. 5,207,241 Babb, this patent discloses that the float is used to over come the hydraulic moment when the valve is closing to keep the valve from snapping shut. This is referred to in the patent when discussing the operation of the valve, stating, "greatly reduces the hydraulic moment". To over come the hydraulic moment in the valve a large cantilevered float is used to close the valve. This then makes the orientation critical if the filling tube in the tank is near the end of the tank. If care by the person installing the valve is not taken, and the valve is oriented with the float toward the close end of the tank, the float will be restricted in movement thus not shutting off the fluid. After filling the tank and the pump is shut-off there is fluid in the filling hose. There are two ways to approach this problem, one, by using a dry disconnect, one that traps the fluid in the hose, or two, by letting the hose drain into the tank. The dry disconnect is an added costly part. In the Babb valve there is a gravity operated valve in the valve body that is to be used for draining the hose. This valve closes with the least amount of flow through the valve, thus making it impractical to be used for draining the filling hose. Another disclosure in the patent is the use of large bearings to overcome the filling and shut-off pressure of the fluid.

Disclosed in U.S. Pat. No. 4,605,201 Miyazaki, is a butterfly valve that closes on a taper to wedge the valve closed and to create an improved seal.

Disclosed on the market and marked patent pending is a valve manufactured by Guillotine. This valve has a coaxial mounted float in respect to the filling tube that addresses the orientation of the installation problem. The design of the valve is such that when the valve starts to shut the float works against the incoming pressure of the fluid until the float over comes the incoming pressure and then snaps shut. The design of the valve also allows clearance in the shut-off area of the valve allowing it to have excessive flow under high pressures when in the off position.

To date there are no valves that shut off the fluid and give an indication of the level of filling. There are federal guidelines in the works to mandate that above ground tanks have a visual and audible type of level indication for each tank when the tank fluid gets to approximately eighty-five percent. These tanks, because of being above ground, are not intended to be filled because of the possible temperature differential between the fluid and the tank. The state of the art to date includes two methods. One being, a clear tube that is attached to the end of the tank at the top and bottom to show the level of fluid. It may not be obvious in a tank in a tank design, of the complexity of getting the tube through the outer tank to the inner tank without having a leak, near term and long term. This also leaves the tube exposed to anything at ground level to damage it, i.e., fork lifts, work persons, etc. The second are sophisticated electronic devices that monitor the level of the fluid from an opening in the tank. These are costly because most have been designed for leak detection in in-ground tanks and must be very accurate. Because they were designed for minute changes due to small leaks and not the large level changes that take place during a filling process.

SUMMARY OF THE INVENTION

To date the prior art has started to address the problems of the growing industry of above ground tanks.

It is therefore an object of this invention to address more of the combination of what is needed to limit spills and to fill a tank in the least amount of time.

A further object of this invention is to have a valve that has no hydraulic moment when closing and then be held shut by the pressure in the charged valve.

A further object of this invention is to have a substantially flat valve seat so that the high pressures involved with filling the tanks will not wedge the valve closed thus failing to reopen when the filling pressure is off.

A further object of this invention is to provide, if the fluid level in the tank positions the float at a position to close the valve, then the level in the tank drops while the valve is off and there is pressure in the filling hose, the float then will be suspended in the off position and will not open the valve.

A further object of this invention is to provide a relief valve that can be adjusted for different fluids and fill pressures.

A further object of this invention is to provide a visual indication of the filling level.

A further object of this invention is to provide a switch to indicated a percentage of fill and a switch to indicate when full.

A further object of this invention is to provide a test arm to manually exercise the level switches to insure operation.

A further object of this invention is to have the flexibility where the control of fill levels are remote from the tank and the level switches form a node in a system that is monitored to control the filling process without the mechanical valve.

Briefly, this invention contemplates having a butterfly type valve with the incoming bore offset from the outgoing bore, so with the valve shut, exposing more of the side of the valve in which to hold the valve shut than the side that would hold the valve open, thus with the butterfly valve being rotatable received, transfers the holding force to the other side. Further, with the valve in any other position the pressure is the same on either side of the valve resulting in no hydraulic moment generated by the incoming fluid.

A brightly colored sight indication and a first switch indication for warning that the tank is about full prior to the shut-off valve shutting off the fluid. A second switch indicating that the tank is at a level, or full, to turn off the pump at approximately the time that the shut-off valve shuts off the flow of fluid.

And an adjustable relief valve for draining the filling hose after the tank has been filled.

BRIEF DESCRIPTION OF THE DRAWINGS

The foregoing and other objects, aspects and advantages will be better understood from the following detailed description of a preferred embodiment of the invention with references to the drawings, in which:

FIG. 13 shows the valve assembly as a node in a control system, thus becoming an electronic valve, where the mechanical valve is not used, and level indication linkage in the closed position mounted in a tank in accordance with the teachings of this invention.

DETAILED DESCRIPTION OF THE PREFERRED EMBODIMENT OF THE INVENTION

Figure 1:
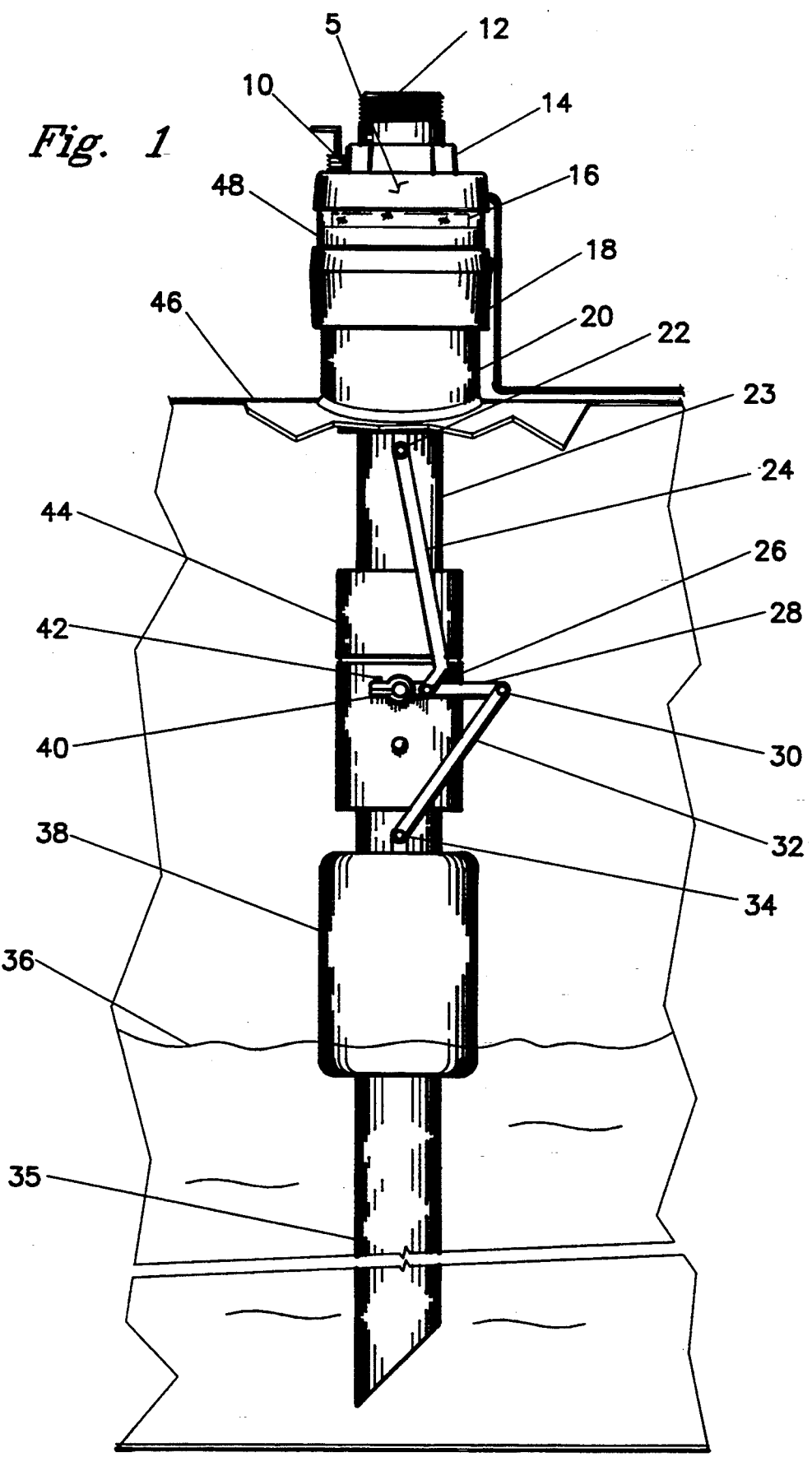
FIG. 1 shows the valve assembly with the valve and level indication linkage in the closed position mounted in a tank in accordance with the teachings of this invention.

Referring now to the drawings, in which the same reference numeral indicates the same element in the various figures, FIG. 1 shows valve assembly 5 with the valve and level indication linkage in the closed position mounted in a tank. Valve assembly 5 is brought to a sight and then threadably received in tank neck 20 and secured with the hex portion 14 of upper cap 10. Threaded end 12 of upper filling tube 23 is coaxially received through upper cap 10 that secures transparent cover 48 covering a visual level indicator 16. Threaded end 12 is used for securing different types of filling couplings. Upper cap 10 is threadably received over lower cap 18 which is threadably received over tank neck 20 that is welded to tank 46. Upper filling tube 23 is threadably received in outer upper valve housing 44.

As the fluid is being pumped into the tank it raises to a level to contact float 38 that is coaxially slidably received over lower filling tube 35. When float 38 floats in fluid 36 the position is linked through pivotal fastener 34 to lower link 32 and pivotal fastener 30 to valve arm 28. This linkage opens and closes the valve. The upper link 24 is connected to the level indication means through pivotal fastener 22 and is connected to valve arm 28 through pivotal fastener 26.

Valve arm 28 is secured to valve 40 with fastener 42.

Figure 2:
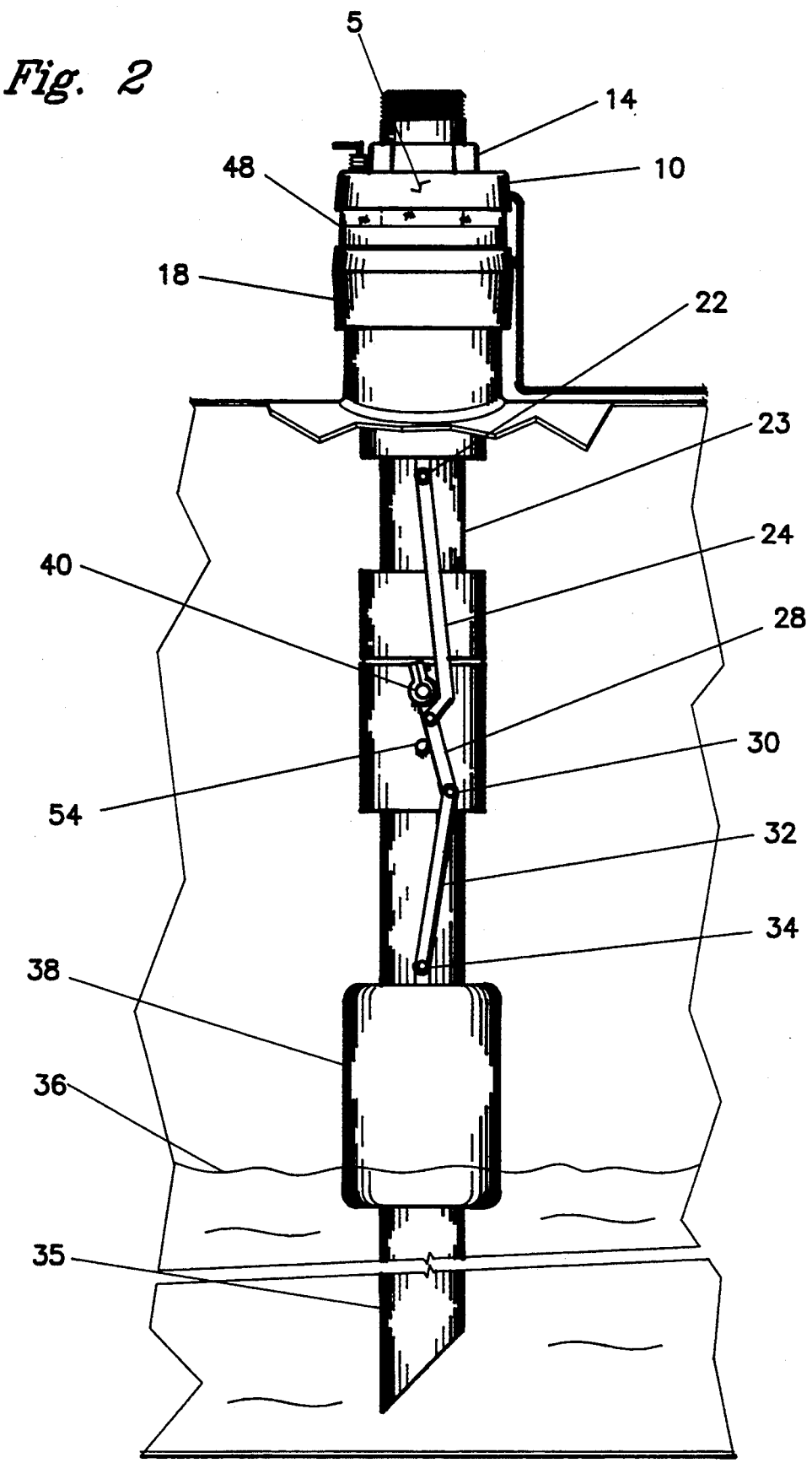
FIG. 2 shows the valve assembly with the valve and level indication linkage in the open position mounted in a tank in accordance with the teachings of this invention.

In FIG. 2 valve assembly 5 is shown mounted in a tank with the valve and level indication in the open position. Valve arm 28 stops against valve arm stop 54 at any time that the fluid is not supporting float 38.

Figure 3:
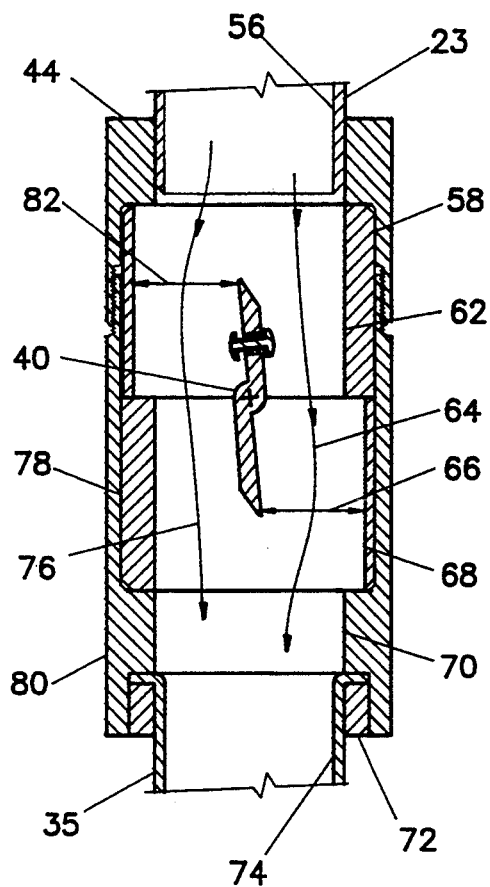
FIG. 3 is a section view of the valve in the open position in accordance with the teachings of this invention.

In FIG. 3 the fluid enters from upper filling tube 23 through upper filling tube bore 56 which is coaxial with lower filling tube bore 74. Upper inner valve housing 58 and lower inner valve housing 78 are coaxially slidably received in lower outer housing 80 and upper outer valve housing 44. Upper outer valve housing 44 is threadably received over lower outer valve housing 80 compressing upper and lower inner valve housings, 58 and 78 respectively, together. Upper valve bore 62 and lower valve bore 68 are offset. Valve 40 is shown in the open position. Fluid passing through the valve is depicted on one side of valve 40 by arrows 64 and on the other side by arrows 76. Distance 82 on one side and distance 66 on the other side are equal and show that valve 40 has the same flow on both sides thus exerting the same pressure on both sides resulting in no hydraulic moment being transferred to valve 40.

Retainer 72 is threadably received into lower outer housing 80 to secure lower filling tube 52. Since the distance from the lower end of lower filling tube 52 and tank 46 should be approximately the same for different size tanks, lower filling tube 52 can vary in length.

Figure 4:
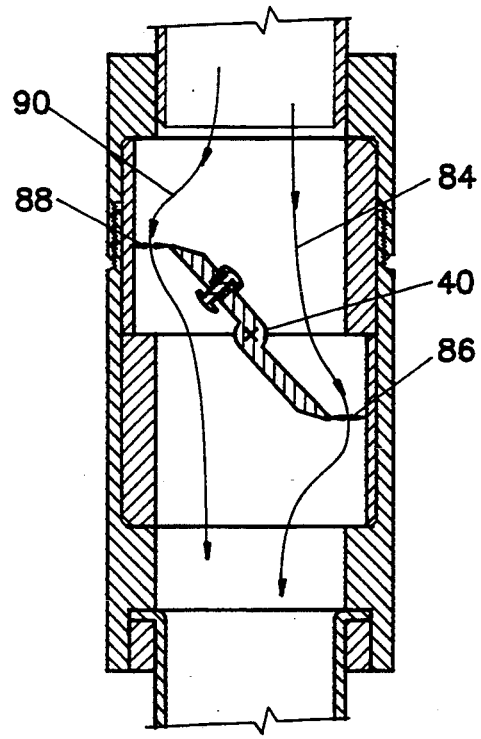
FIG. 4 is a section view of the valve open to approximately forty-five degrees in accordance with the teachings of this invention.

In FIG. 4, valve 40 is shown at approximately forty-five degrees from the closed position. Fluid passing through the valve is depicted on one side of valve 40 by arrows 84 and on the other side by arrows 90. Although the fluid is being more restricted and the flow is different than in FIG. 3, distance 86 on one side and distance 88 on the other side are equal, and shows that valve 40 has the same flow on both sides thus exerting the same pressure on both sides resulting in no hydraulic moment being transferred to valve 40.

Figure 5:
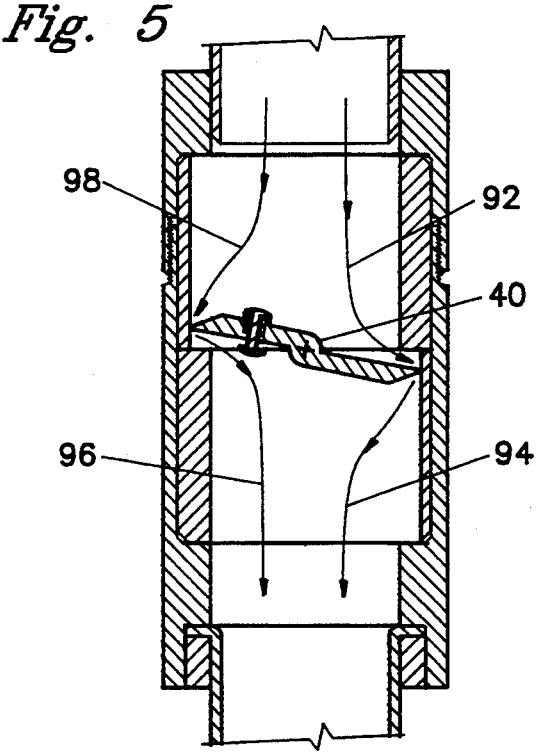
FIG. 5 is a section view of the valve open to approximately ten degrees in accordance with the teachings of this invention.

In FIG. 5, valve 40 is shown at approximately ten degrees from the closed position. Fluid passing through the valve is depicted on one side of valve 40 by arrows 92 and on the other side by arrows 98. Although the fluid is almost cutoff valve 40 has the same flow on both sides thus exerting the same pressure on botch sides resulting in no hydraulic moment being transferred to valve 40. This flow will continue until float 38 of FIG. 1 and associated linkages close valve 40 to a point that the restriction is small enough to stop the flow of fluid at which time valve 40 is closed.

Figure 6:
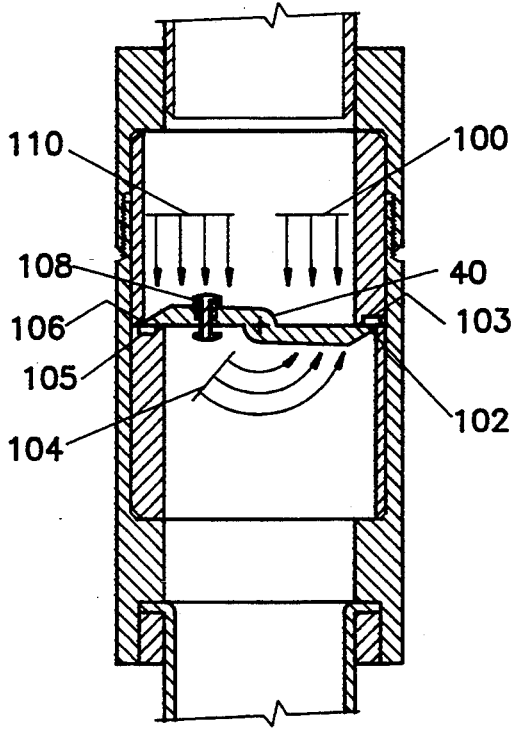
FIG. 6 is a section view showing the valve and relief valve in a closed position in accordance with the teachings of this invention.

The manufacturing tolerances applied in the fabrication of valve seats 106 and 102 in FIG. 6 and the mating surface of valve 40 could pass fluids with low viscosities. In these applications elastomer seals 103 and 105 could be used. It should be appreciated that these seals could be recessed in valve 40 or as shown in upper inner housing 58 and lower inner housing 78.

The pressure in the filling hose applying in actual pounds to valve 40 is between 300 and 600 lbs. In other valves bearings 130 and 122, FIG. 8, must be much larger because they take the total pressure when valve 40 is closed. Valve seats 106 and 102 are shown substantially flat. Any deflection in valve 40 will be transferred directly to valve seat 106 and bearings 130 and 122. In this configuration valve 40 receives less than half of the applied pressure and there is no wedge formed in the cutoff area to wedge the valve in a closed position.

FIG. 6 shows relief valve 108 through closing side 110 of valve 40, valve 40 in the closed position and arrows depicting the incoming pressure on the closing side 110 of valve 40, the resisting side 100 of valve 40 and with valve 40 being rotatably received the resultant pressure 104 to hold valve 40 closed. Showing how the force is transferred can be calculated with percent of area or actual values, because of the high pressures involved, the actual values will be used for a given size of valve. It should be appreciated that the valve could be made in any size and the resultant difference would only be a percent of change from the size of valve being used. If the effective size of the valve is approximately 2.500 inches in diameter then the total area is 4.908 inches and with 70 psi and 120 psi of incoming pressure, the force on valve 40 would be 343 lbs. and 589 lbs., respectively. Giving the example of valve 40 with the lower pressure first, closing side 110 would have 168 lbs., resisting side 100 would have 107 lbs., shaft part 125, FIG. 9, of valve 40 would have 68 lbs., making the difference between closing side 110 and resisting side 100 being the resultant pressure 104 of 61 lbs. More than enough to hold resisting side 100 shut. Now giving the example of valve 40 with the higher pressure, closing side 110 would have 289 lbs., resisting side 100 would have 184 lbs., shaft part 125, FIG. 9, of valve 40 would have 123 lbs., making the difference between closing side 110 and resisting side 100 being the resultant pressure 104 of 105 lbs. Again more than enough to hold resisting side 100 shut.

In prior art the float had to be of a size to force the valve shut, with float 38 in FIG. 1, now only needing to position valve 40 in the closed position float 38 can be made smaller. The standard opening in the tank where valve assembly 5 is installed is only 4 inches. With a smaller float the fill tubes can be made larger so there is less restriction, thus lowering the pressure during the filling process.

Once valve 40 has closed in the filling process the high differential pressure, resultant pressure 104, on valve 40 can hold float 38 in FIG. 1 and associated linkages in the closed position as long as the filling pump pressure remains high even if the tank would get a leak, for any reason whether it be from a old tank, improperly installed tank, a damaged tank, etc., and started spilling the fluid from the tank. Keeping in mind there is more of a chance of a newly filled tank at its capacity failing than an almost empty tank. In other valves of prior art if this type leak would start, the valve would open and continue pumping fluid out of the leak until the filling person got back to the filling truck and turned off the filling pump.

Figure 7:
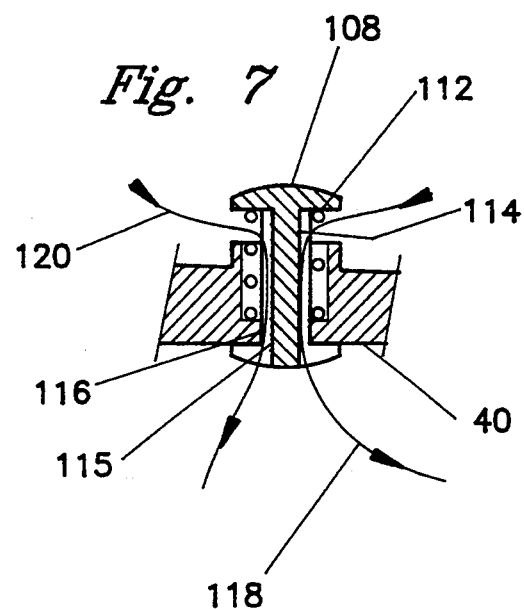
FIG. 7 is a section view showing the relief valve in an open position in accordance with the teachings of this invention.

After a tank has been filled and before the filling hose has been disconnected from the valve there is fluid in the filling hose. In some installations a dry disconnect is used, meaning there are valves in the filling hose and valves on top of the shut-off valve assembly threadably received on threaded end 12 of upper filling tube 23 in FIG. 1. When disconnected these valves close to seal the disconnected ends, and the filling person then stores the filling hose. There are almost always dry disconnects at the truck end between the filling hose and the truck. Dry disconnects are costly and it would be advantageous not to have to use them on every individual tank. In an installation where a dry disconnect is not used, the filling person disconnects the filling hose from the tank truck with a dry disconnect, leaving the filling hose connected to the upper filling tube 23 of FIG. 1, the filling person then holds the filling hose over their head and walks the hose to the tank draining the fluid in the hose by relief valve 108 in FIG. 7, as shown in the open position. Relief valve 108 has grooves 115 to allow the fluid, depicted by arrows 120 and 118, to flow by relief valve 108 and through opening 116 of valve 40. When there is no filling pressure or flow, spring 112 opens relief valve 108. When the filling pressure and flow are high enough to over come spring 112 relief valve 108 closes and remains closed until the pressure is stopped, at which time the fluid left above valve 40 FIG. 6 drains into the tank.

Different viscosities of fluid and filling pressures effect the operation of relief valve 108. Therefore the amount of spring pressure must be adjusted for different fluids. Having a separate part, i.e. spring 112, springs of different forces can be fitted to relief valve 108 to adjust the applied pressure for different fluids.

With the ability to adjust the pressure applied to relief valve 108 the filling hose can be drained of the remaining fluid after the pump has been turned off, thereby making it unnecessary to need a dry disconnect at each individual tank.

Figure 11:
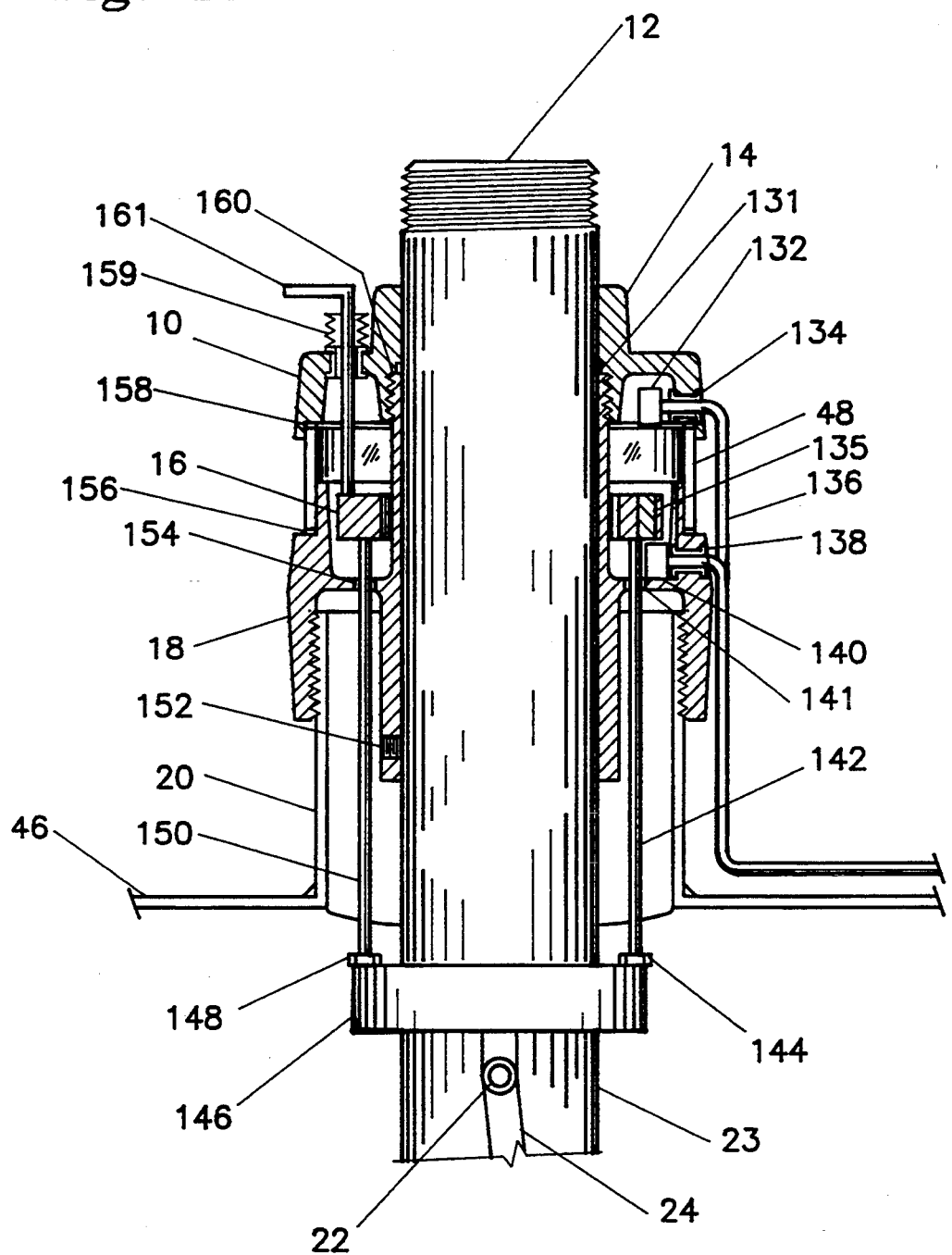
FIG. 11 is a section view of the level indication means, with the level indication in the position showing that the level of fluid is not near a filled position in accordance with the teachings of this invention.

When an application does not need the fluid to drain out of the filling hose, i.e., with a dry disconnect on both ends of the filling hose or the filling pump is only turned off by the upper or lower switches, 132 and 140 FIG. 11, respectively, then relief valve 108 is not needed. If any fluid above valve 40 remains after the filling process it would remain until a lower level of fluid in the tank, letting float 38 and associated linkages open valve 40, because there is no longer pressure on valve 40 to hold it closed, and draining the fluid above valve 40 into the tank.

Figure 8:
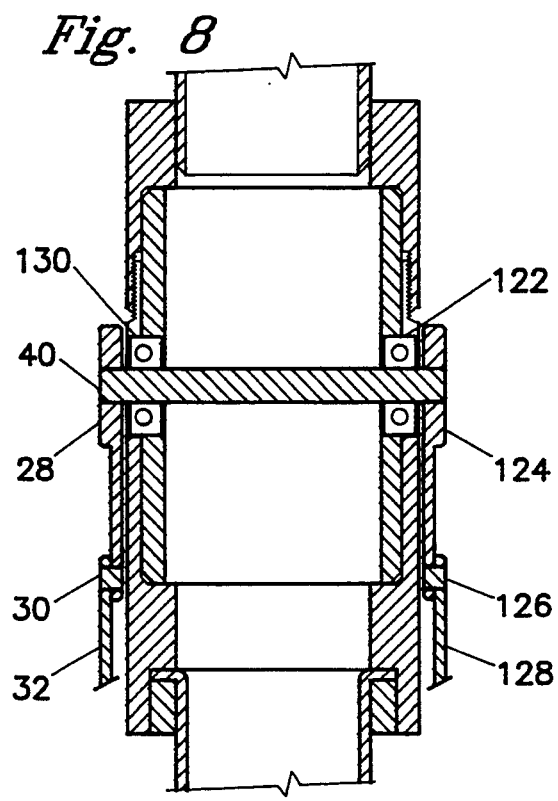
FIG. 8 is a section view through the valve shaft, bearings and level indication linkage in accordance with the teachings of this invention.

FIG. 8 shows valve 40 being rotatably received in bearings 130 and 122 with valve arms 28 and 124 attached, and the pivotal fasteners 30 and 126 fastening lower links 32 and 128.

Figure 9:
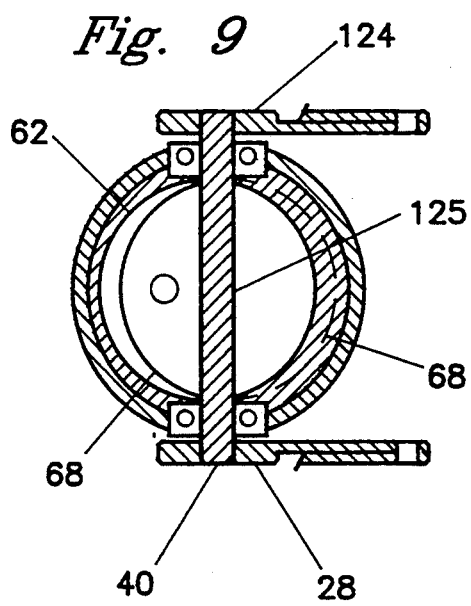
FIG. 9 is a top section view through the centerline of the valve showing the offset of the incoming and outgoing bores in a round configuration in accordance with the teachings of this invention.

FIG. 9 shows a top view through the centerline of a round shaped valve with shaft part 125 of valve 40 and showing the offset of incoming bore 62 in respect to outgoing bore 68.

Figure 10:
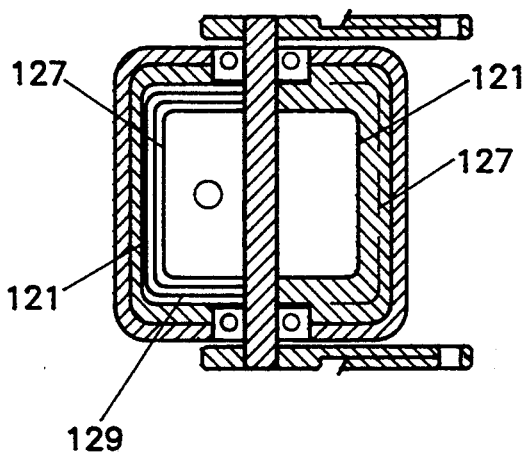
FIG. 10 is a top section view through the centerline of the valve showing the offset of the incoming and outgoing bores in a square configuration in accordance with the teachings of this invention.

FIG. 10 shows a top view through the centerline of a square shaped valve with an elastomer seal 129, incoming bore 127 and outgoing bore 121. In this configuration the valve seats can be of equal size.

FIG. 11 shows upper cap 10 being threadably received over lower cap 18 and compressing upper filling tube seal 131 and upper and lower transparent cover seals 158 and 156, respectively, to stop fumes from inside the tank leaking into the atmosphere. Ledge 160 stops the rotation between upper cap 10 and lower cap 18 so lower cap 18 can be threadably received over tank neck 20 when secured by hex portion 14.

Visual level indicator 16 is shown in the position where the fluid is not near the filled position and holding magnet 135 that actuates, when in close proximity, lower reed switch 140 and upper reed switch 132. It is to be appreciated that lower reed switch 140 and upper reed switch 132 could be of various types, i.e., hall effect, cross bar, snap, etc. If the tank is being used for inflammable type fluids then both switches should be sealed. Upper and lower switch seals, 134 and 138, respectively, seal the switch wires between wire conduit 136 and valve assembly 5, FIG. 1, from atmospheric contaminants coming into valve assembly 5 and fumes from the tank coming out. Test arm 161 is used to exercise upper and lower reed switches, 132 and 140, respectively, and bellows seal 159 seals fumes in tank.

Right and left adjusting rods 142 and 150, respectively, are connected to visual level indicator 16 and pass through holes 141 and 154 in lower cap 18, and are threadably received and secured by nuts 144 and 148 in carrier 146 that is slidably received over upper filling tube 23 and is positioned by upper link 24 through pivotal fastener 22. Right and left adjusting rods 142 and 150 are adjusted to position magnet 135 to operate lower reed switch 140 in the lowest position and to operate upper reed switch 132 in the highest position. When visual level indicator 16 starts to rise, magnet 135 releases lower switch 140 signaling that the tank is at the predetermined level of fill where lower switch 140 has been adjusted.

Figure 12:
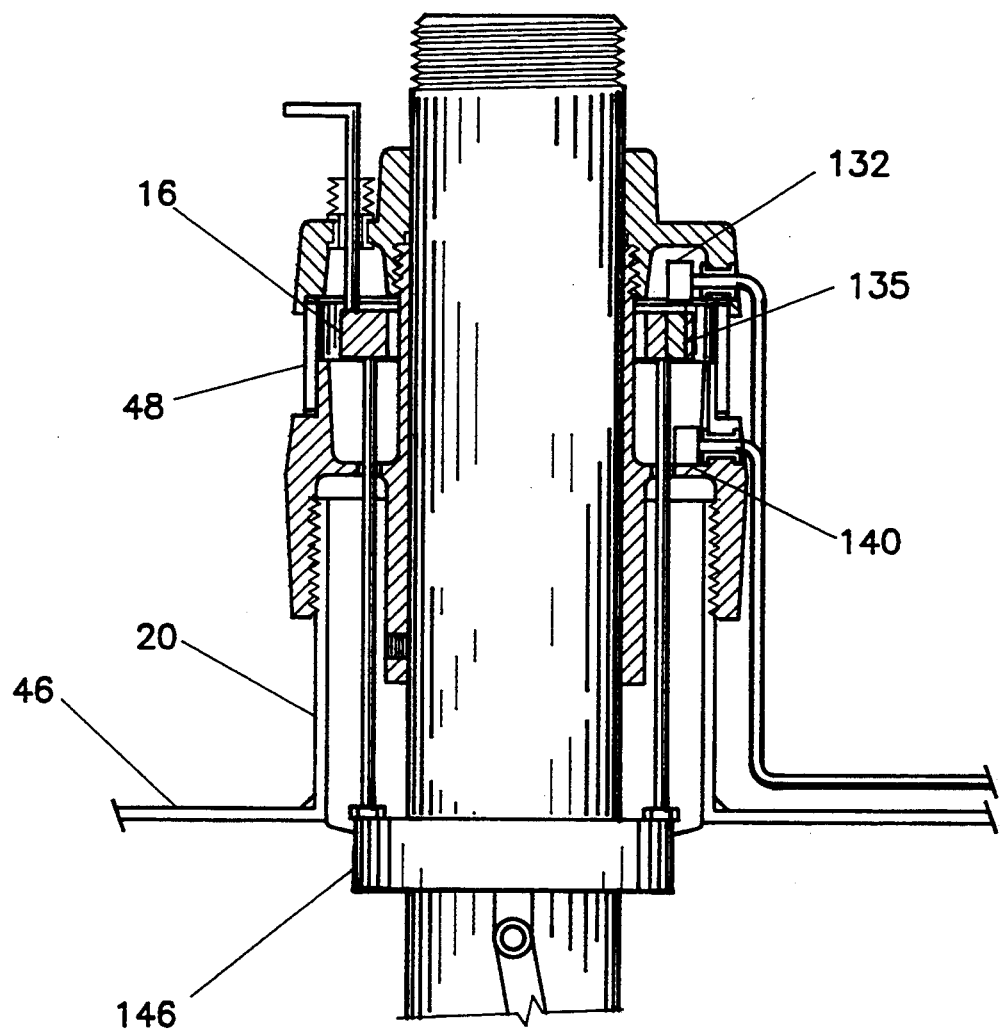
FIG. 12 is a section view of the level indication means, with the level indication in the position showing that the tank is in a full condition in accordance with the teachings of this invention.

When the level of fluid in the tank has moved visual level indicator 16 to a predetermined level magnet 135 activates upper switch 132, as shown in FIG. 12, to signal this condition.

Tank 46 is manufactured in various sizes, as to length, diameter or gallons. The position of valve 40 must be at a point to signal when tank 46 is full and to shut off the flow of fluid into tank 46. To adjust the location of valve 40, upper filling tube 23 slides in lower cap 18 and is secured at a given location with threaded fastener 152. If adjustment is out of the range of a given upper filling tube 23, a different length is fitted.

FIG. 13 shows valve assembly 5 in the simplest form with no mechanical valve. In this form the valve becomes and electronic valve, in as much as the valve is a node in a controlling system and the level of fill is controlled remote from the tank. Thus limited responsibility is on the filling person to limit fill levels making it a safe way to control the filling process. Float link 164 connects float 38 to the level indication means through pivotal fasteners 22 and 34. Threaded end 166 of filling tube 162 is coaxially received through upper cap 10 that secures transparent cover 48 covering a visual level indicator 16. Threaded end 166 is used for securing different types of filling couplings. Upper cap 10 is threadably received over lower cap 18 which is threadably received over tank neck 20 that is welded to tank 46.

Being able to walk up to an above ground tank with one piece of hardware, namely valve assembly 5, and install it in the tank with features that heretofore have not been available, namely adjustable visual and switch indication of level of fill, and then having the protection from damage that valve assembly 5 has being mounted on top of a tank, is most advantageous to tank owners.

Because of only using switches supplying power to valve assembly 5 is not necessary. To monitor the different levels of fill from a remote location the switches give the most flexibility. They can be wired to a plug box near where the filling truck is parked and be connected to the truck to cutoff the pump when full. The switches can be wired to computer I/O PCB's to electronically signal when the tank is full and near full. The switches can be wired to an audible alarm to signal when the tank is full and near full. The visual indication can alert the filling truck person that the tank is full or near full. Test arm 161 can be included in logic software that is electronically monitoring the filling process, i.e., if the switches are not exercised prior to the filling to begin, the logic will not turn on the pump to start filling the tank. This makes for a safe test to insure that the switches are in operating order prior to starting the filling process, especially if the mechanical valve is not used.

The invention as described in the preferred embodiment has been described with a round and square bores, being used for above ground tanks, being designed from multiple housings, and being used to cutoff fluids. It is obvious to those skilled in the art to have rectangular or other shaped bores with corresponding butterfly valves, be used with in-ground tanks, be fabricated from one housing, and that the valve could be used to cutoff other pressure fed commodities and still reflect the advantages of the invention.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A valve to cutoff flow comprising in combination:
   a housing with an upper substantially flat bottom bore axially intersecting an opposing and offset lower substantially flat bottom bore;
   said flow enters said valve through said upper offset bore and exits said valve through said lower offset bore;

a first and second valve seat, resultant of the exposed area, where said upper and lower offset bores axially intersect;

said intersect forms a common plane forming said first and second valve seat;

said offset bores being equally disposed on opposite side of said valve seats;

said offset bores are equally disposed on opposite sides of said valve seats;

a butterfly valve shaft rotatably received perpendicular to and centered between said offset bores axes intersecting at said first and second valve seats to allow said butterfly valve to move from an open position to a closed position;

said butterfly valve with a first and second valve member of substantially equal areas extending radially from said shaft and substantially coextensive with said offset bores when said butterfly valve is in said closed position;

a first flow cutoff surface of said first valve member disposed on a plane intersecting and parallel to said butterfly valve shaft centerline and facing said first valve seat;

said second valve member is diametrically opposite said first valve member;

a second flow cutoff surface of said second valve member faces said second valve seat; and said first and second flow cutoff surfaces contact said first and second valve seats when said butterfly valve is in said closed position whereby, with said butterfly valve in any position from said open position prior to said closed position, the area between said first valve seat and said butterfly valve is substantially equal to the area between said second valve seat and said butterfly valve relative to said offset bores in any position of said butterfly valve, and the flow through said areas are substantially equal.

2. A valve to cutoff flow as claimed in claim 1, wherein the area exposed to said upper bore of said first valve member is greater than the area exposed to said upper bore of said second valve member; and said first valve member is held in contact with said first valve seat and said second valve member is held in contact with said second valve seat by the product of the greater differential area of said first valve member and a filling pressure that is created by the filling of a tank means.

3. A valve to cutoff flow as claimed in claim 1, wherein the area exposed to said upper bore of said first valve member is greater than the area exposed to said upper bore of said second valve member;

said first valve member is held in contact with said first valve seat and said second valve member is held in contact with said second valve seat by the product of the greater differential area of said first valve member and the filling pressure, and will remain in said closed position until said filling pressure is reduced.

4. A valve to cutoff flow claimed in claim 1, further including said first valve member operates in said upper bore;

a relief valve disposed in said first valve member; and said relief valve is spring biased to an open position;

said relief valve remains closed when said butterfly valve is in said closed position by said filling pressure; and said relief valve opens by said spring bias when said filling pressure is reduced to a predetermined pressure.

5. A valve to cutoff flow as claimed in claim 1, further including a float that contacts and follows the level of a fluid;

an arm fastened to said shaft; and a linkage to connect said float to said arm to rotate said butterfly valve from said open position to said closed position.

6. A valve to cutoff flow as claimed in claim 1, further including an elastomer seal disposed between said first and second valve members and said first and second valve seats.

7. A valve to cutoff flow as claimed in claim 1, further including a float that contacts and follows the level of fluid as said fluid rises;

a first switch to be connected to a monitoring system to indicate a level of fill of said fluid;

an actuator to actuate said first switch; and a linkage that connects said float to said actuator.

8. A valve to cutoff flow as claimed in claim 7, wherein said switch is adjustable to indicate a full condition.

9. A valve to cutoff flow as claimed in claim 7 further including a second switch that can be adjusted to indicate a percent of fill prior to said first switch actuation;

an actuator to actuate said second switch; and a linkage to connect said float to said actuator.

10. A valve to cutoff flow as claimed in claim 7, further including a visual indicator;

a linkage to connect said float to said visual indicator; and said visual indicator is exposed from more than one side of said valve.

11. A valve to cutoff flow as claimed in claim 7, further including a test arm connected to said switch actuator means extending exteriorly from said valve to manually exercise said switch.

12. A valve to monitor the level of fluid in a storage tank while the tank is being filled, cutoff the flow of fluid when the tank is in a full condition, and as long as the filling pressure is on the valve the valve will remain cutoff even if the fluid level in the tank has lowered comprising in combination:

a lower cap threadably received to a filling neck of said storage tank;

an upper filling tube coaxially received through said lower cap and threadably received in fluid entrance end of an upper outer valve body;

a lower outer valve body that threadably receives said upper outer valve body;

a lower filling tube secured by a retainer threadably received in the fluid exit end of said lower outer valve body;

an upper and lower inner housing coaxially received and having an engagement therebetween at a mating surface in said upper and lower outer valve bodies;

said upper inner housings with a first bore offset from a second bore in said lower inner housing;

a first and second valve seat resultant of the exposed area of said offset bores at said mating surface;

said first valve seat exposed to said fluid entrance of said valve;

said second valve seat exposed to said fluid exit of said valve;

a butterfly valve centerline perpendicular to said offset bores and radially intersecting said mating surface;

said butterfly valve with a first and second semicircular member with offset axes;

said semicircular members offset axes and radii are matched to said offset bores;

said semicircular members axes are perpendicular to said butterfly valve centerline;

a shaft coaxially received through said butterfly valve centerline;

a first flow cutoff surface of said first semicircular member is disposed on a plane intersecting and parallel to said butterfly valve centerline extending radially from said shaft and faces said first valve seat;

said second semicircular member is diametrically opposite said first semicircular member, wherein, a second flow cutoff surface of said second semicircular member faces said second valve seat;

said shaft is rotatably received for moving said butterfly valve from an open position to a closed position;

said first and second flow cutoff surfaces contact said first and second valve seats in said closed position;

the area exposed to said first bore of said first semicircular member is greater than the area exposed to said first bore of said second semicircular member;

said first semicircular member is held in contact with said first valve seat and said second semicircular member is held in contact with said second valve seat by the product of the greater differential area of said first semicircular member and the filling pressure and will remain in said closed position until said filling pressure is reduced;

when said butterfly valve is in any position from said open position prior to said closed position the area between said first valve seat and said butterfly valve is equal to the area between said second valve seat and said butterfly valve, and the flow through said areas are substantially equal;

said first semicircular member operates in said first bore;

a relief valve is spring biased to an open position;

said relief valve is disposed in said first semicircular member;

said relief valve is adjustable for different fluids by changing the pressure of said spring;

an arm fastened to said shaft;

a linkage fastened to said arm;

a float coaxially slidably received over said upper filling tube and fastened to said linkage;

said float contacts and follows said level of said fluid in the filling process to rotate said butterfly valve from said open position to said closed position; and after said filling pressure is off and said fluid lowers, said float follows said fluid level until said butterfly valve is in said open position.

* * * * *